US008843342B2

(12) United States Patent
Vold et al.

(10) Patent No.: US 8,843,342 B2
(45) Date of Patent: Sep. 23, 2014

(54) METHODS AND APPARATUS FOR HIGH-RESOLUTION CONTINUOUS SCAN IMAGING

(75) Inventors: Havard I. Vold, Charleston, SC (US); Paul G. Bremner, Del Mar, CA (US); Parthiv N. Shah, San Diego, CA (US)

(73) Assignee: ATA Engineering, Inc., San Diego, CA (US)

( * ) Notice: Subject to any disclaimer, the term of this patent is extended or adjusted under 35 U.S.C. 154(b) by 247 days.

(21) Appl. No.: 12/982,297

(22) Filed: Dec. 30, 2010

(65) Prior Publication Data

US 2011/0293171 A1 Dec. 1, 2011

Related U.S. Application Data

(60) Provisional application No. 61/349,682, filed on May 28, 2010.

(51) Int. Cl.
*G03H 3/00* (2006.01)
*G03H 1/08* (2006.01)

(52) U.S. Cl.
CPC ............ *G03H 3/00* (2013.01); *G03H 2227/03* (2013.01); *G03H 1/08* (2013.01); *G03H 1/0866* (2013.01)
USPC ........................................................ 702/109

(58) Field of Classification Search
CPC .............................. G03H 3/00; G05B 23/0202
USPC ........................................................ 702/109
See application file for complete search history.

(56) References Cited

U.S. PATENT DOCUMENTS 4,483,195 A * 11/1984 Brown et al. ................... 73/702
5,986,971 A * 11/1999 Kim et al. ........................ 367/8
2011/0120222 A1 * 5/2011 Scholte et al. ................. 73/603

OTHER PUBLICATIONS

Cai, Yuhan and Ng, Raymond, Indexing Spatio-Temporal Trajectories with Chebyshev Polynomial, Proceedings of the 2004 ACM SIGMOD International conference on Management of Data Paris France Jun. 13-18, pp. 599-610.*
Thomson, D.J.; , "Estimation of coherences between complicated processes," Spectrum Estimation and Modeling, 1990., Fifth ASSP Workshop on , vol., no., pp. 256-260, Oct. 10-12, 1990.*
Cai, Yuhan and Ng, "Raymond, Indexing Spatio-Temporal Trajectories with Chebyshev Polynomial," Proceedings of the 2004 ACM SIGMOD International conference on Management of Data, Paris France, pp. 599-610, Jun. 13-18.*
Thomson, D.J., "Estimation of coherences between complicated processes," Spectrum Estimation and Modeling, 1990., Fifth ASSP Workshop, pp. 256-260, Oct. 10-12, 1990.*

* cited by examiner

*Primary Examiner* — Jonathan C Teixeira Moffat
*Assistant Examiner* — Joseph J Yamamoto
(74) *Attorney, Agent, or Firm* — Ingrassia Fisher & Lorenz, P.C.

(57) ABSTRACT

A continuous scanning method employs one or more moveable sensors and one or more reference sensors deployed in the environment around a test subject. Each sensor is configured to sense an attribute of the test subject (e.g., sound energy, infrared energy, etc.) while continuously moving along a path and recording the sensed attribute, the position, and the orientation of each of the moveable sensors and each of the reference sensors. The system then constructs a set of transfer functions corresponding to points in space between the moveable sensors, wherein each of the transfer functions relates the test data of the moveable sensors to the test data of the reference sensors. In this way, a graphical representation of the attribute in the vicinity of test subject can be produced.

19 Claims, 12 Drawing Sheets

METHODS AND APPARATUS FOR HIGH-RESOLUTION CONTINUOUS SCAN IMAGING

CROSS-REFERENCE TO RELATED APPLICATIONS

This application claims the benefit of U.S. Prov. Pat. App. No. 61/349,682, filed May 28, 2010, the entire contents of which are incorporated by reference herein.

GOVERNMENT RIGHTS

The present invention was made under a contract with an agency of the United States Government, i.e.: Air Force Research Laboratory FA8650-07-M-6784. The U.S. Government has certain rights in this invention.

TECHNICAL FIELD

Embodiments of the subject matter described herein relate generally to imaging techniques and, more particularly, to three-dimensional imaging of test subjects.

BACKGROUND

It is often desirable to scan a test subject and/or a three-dimensional area around a test subject using some form of imaging technique. Acoustical holography, for example, is a method often used to characterize the surface velocities and acoustic pressures of coherently vibrating structures such as engines and gearboxes.

For aeroacoustic noise sources such as jets with multiple partially-correlated source mechanisms, scan-based techniques using reference and response transducers and singular value decomposition have been applied to acoustical holography to decompose a noise source into partial fields. The partial fields can reconstruct an overall sound field and also provide a near-field representation of the source that can help in understanding the physics of jet noise.

The acoustic source characteristics of jet plumes from high performance military fighter engines are not well defined, however. This is due to the difficulty in making a complete set of descriptive acoustic measurements characterizing the size, intensity, directivity, and distribution of the acoustic source (i.e., jet plume).

Acoustic near-field acoustic holography concepts have been proposed for full-scale jet engines. An acoustic hologram is a phase-locked "picture" of a spatially coherent pressure (or velocity) field that corresponds to an equivalently vibrating surface at the measured points. Acoustic holograms are typically presented on a frequency by frequency basis. By making successive array measurements ("scans") over a sufficiently large hologram surface in a source-free region, this technique allows, in theory, for an inverse propagation of the wavenumber spectrum of the measured surface pressures to any surface closer to (but still containing) the source, as well as a complete description of the sound field further away from the source. Aeroacoustic sources such as jets do not actually produce a spatially coherent pressure field, so an acoustical holography system for high-speed jets must approximate the sound source as a number of mutually incoherent acoustic holograms ("partial fields").

Acoustic near-field acoustic holography concepts have yet to be realized for full-scale jet engines, in part because of the large number of sensors required. For example, a 3-D microphone measurement array to fully characterize the acoustic field around an aircraft and jet plume might require hundreds or even thousands of individual acoustic sensors.

It is therefore desirable to provide imaging systems and methods that are efficient, fast, and allow three-dimensional scanning to be performed using a reduced number of sensors. Other desirable features and characteristics of the present invention will become apparent from the subsequent detailed description and the appended claims, taken in conjunction with the accompanying drawings and the foregoing technical field and background.

BRIEF SUMMARY OF THE INVENTION

A method of imaging a test subject in accordance with one embodiment includes providing one or more moveable sensors and one or more reference sensors within a test environment. Each reference sensor and moveable sensor is configured to sense an attribute (e.g., acoustic, thermal, etc.) of the test subject. The moveable sensors are moved along a path while continuously acquiring test data, the test data comprising the sensed attribute, the position, and the orientation of each of the moveable sensors and each of the reference sensors. A set of transfer functions corresponding to points in space that have been visited by the moveable sensors are constructed, each of the transfer functions relating the test data of the moveable sensors to the test data of the reference sensors. A visual representation of the attribute on or in the vicinity of the test subject is produced.

A system for scanning a test subject in accordance with one embodiment includes: one or more moveable sensors, each moveable sensor configured to continuously sense an attribute of the test subject during a test mode in which the moveable sensor moves along a path with respect to the test subject; one or more reference sensors, each reference sensor configured to sense the attribute of the test subject during the test mode; a data acquisition system coupled to the moveable sensors and the reference sensors, the data acquisition system configured to acquire data associated with the sensed attribute, the position, and the orientation of each of the moveable sensors and the reference sensors during the test mode; and a processor configured to analyze the acquired data to produce a dataset constructing a transfer function at points in space visited by the moveable sensors and the reference sensors.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, many conventional techniques and principles related to imaging, acoustics, data acquisition, jet exhaust, and the like are not described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

In general, the present invention relates to a continuous scanning method employing one or more moveable sensors and one or more reference sensors deployed in the environment around a test subject. Each sensor is configured to sense an attribute of the test subject (e.g., sound energy, infrared, etc.) while continuously moving along a path and recording the sensed attribute, the position, and the orientation of each of the moveable sensors and each of the reference sensors. The system then constructs a set of transfer functions corresponding to points in space visited by the moveable sensors, wherein each of the transfer functions relate the test data of the moveable sensors to the test data of the reference sensors. In this way, a graphical representation of the attribute in the vicinity of test subject can be produced.

In one embodiment, finite-element-type basis functions (such as Chebyshev polynomials) are used to produce a full two-dimensional (2D) surface scan using a set of one-dimensional (1D) linear scans. In a further embodiment, canonical coherence-based partial field estimation is used to accurately compute transfer functions to describe the source using fewer partial fields (i.e., principal components).

Figure 1:
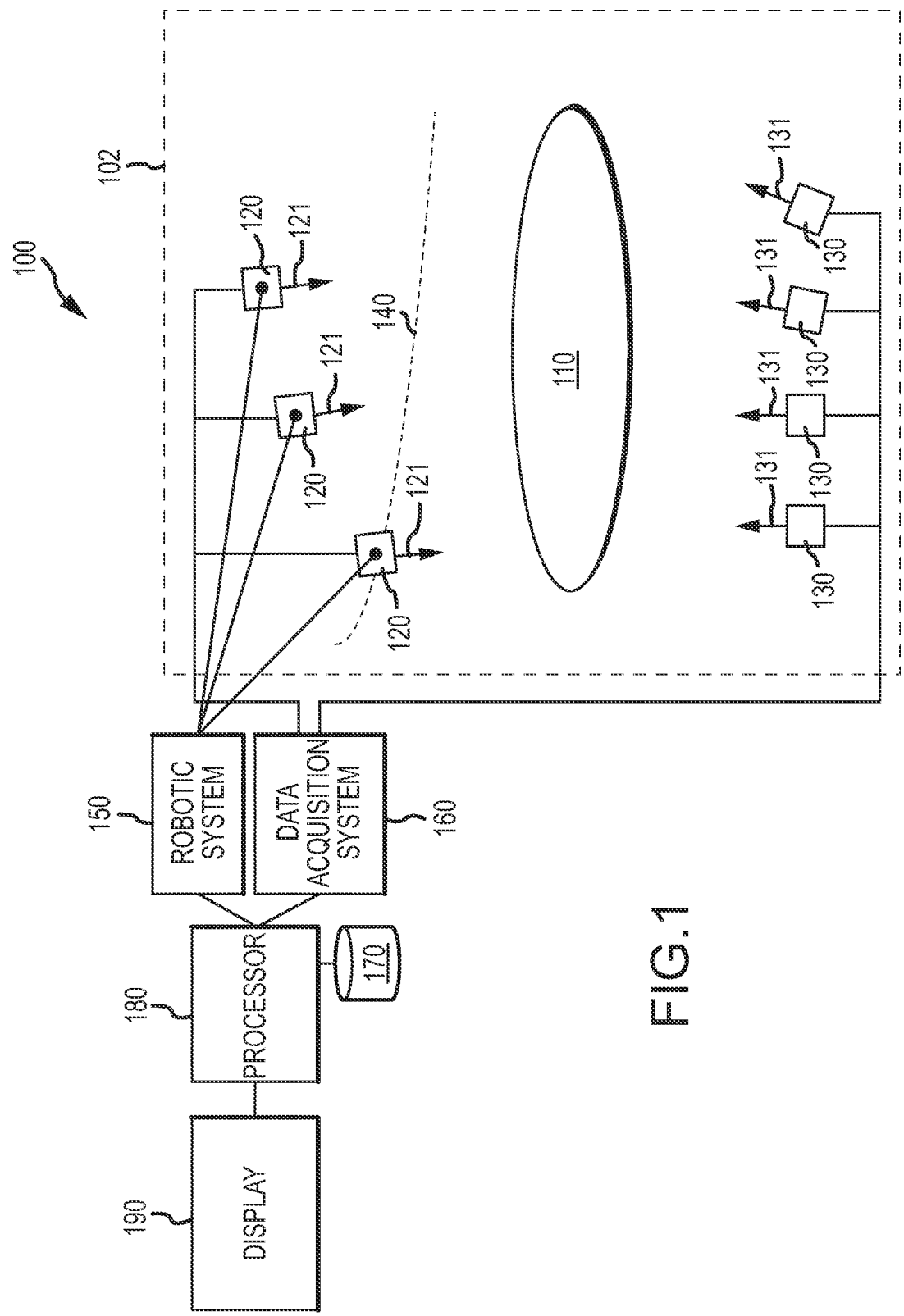
FIG. 1 is an conceptual block diagram of an imaging system in accordance with one embodiment of the invention.

Referring now to FIG. 1, an imaging system 100 in accordance with one embodiment generally includes a test environment 102 (e.g., a room, chamber, or simply an abstract spatial region) in which a test subject 110 has been placed. Test subject 110 may be any type of object (which may be organic, nonorganic, a life form, etc.) or phenomena having an attribute (sound energy, heat energy, an internal component or structure, etc.) to be sensed. In one embodiment, as described in detail below, test subject 110 is a high speed jet or jet engine, and the sensed attribute is sound energy (or "noise") produced by the jet engine during operation. In this regard, while the invention is often described in the context of imaging an acoustic hologram (or partial fields) around an operating jet exhaust, this example is used without loss of generality. The continuous scanning methods described herein may be used to sense a wide variety of attributes of many types of objects or phenomena.

One or more moveable sensors 120 are provided within environment 102. Each sensor 120 is coupled to a robotic system 150 and a data acquisition system 160. Similarly, one or more reference or "stationary" sensors 130 are also provided within environment 102, and are coupled to data acquisition system 160. Each moveable sensor 120 has a spatial position and an orientation 121. Each reference sensor 130 (which is generally stationary) also has a corresponding orientation 131.

Robotic system 150 and data acquisition system 160 are communicatively coupled to a processor 180, which itself is communicatively coupled to a display 190 (e.g., an LCD or other such display) and a storage unit 170 (e.g., a solid-state drive, a hard drive, etc.). The various functional blocks 180, 150, 170, 190, and 160 may be implemented in any combination of hardware, firmware, and software. In one embodiment, for example, display 190, processor 180, and storage unit 170 are integrated into a general purpose computer with a suitable I/O interface (not shown) to robotic system 150 and data acquisition system 160. In a further embodiment, data acquisition system 160 is also integrated (via hardware and/or software) into processor 180.

Robotic system 150, under control of processor 180, is configured to cause each moveable sensor 120 to move along a path 140, which is typically predefined or otherwise known a priori by the system. The term "robotic system" is used in the general sense of any mechanical system that causes movement within a three-dimensional space through any convenient articulation scheme. Thus, this term comprehends the use of a wide variety of systems, ranging from simple rotating structures to complex, multi-axis robotic arms.

Data acquisition system 160 is configured to acquire scan test data associated with subject 110 while robotic system 150 moves sensors 120 along their respective paths 140, including corresponding position/orientation data of sensors 120. In preferred embodiments, the data acquisition system acquires the test data in a continuous manner as the sensors 120 are moved. The test data is then stored (e.g., within storage unit 170) and analyzed by processor 180 to produce a three-dimensional representation of the attribute, which may then be displayed on display 190. Data acquisition system 160 may include any number of software and hardware components capable of performing the desired acquisition of data, including conventional data acquisition systems known in the art.

The scanning by data acquisition system 160 is "continuous" in that, in contrast to "discrete" scanning, the moveable sensors 120 do not move to a discrete location, allow data acquisition system 160 to take one or more measurements, then move on to the next discrete location; rather, data acquisition system 160 acquires the test data substantially continuously as the moveable sensors 120 move along their paths 140. At the same time, data acquisition system 160 acquires data from reference sensors 130.

The position and orientation of each moveable sensor 120 (e.g., x, y, z Cartesian coordinates and an orientation vector) may be determined from robotic system 150, or may determined in real time via a locationing method. For example, each sensor 120 may include a GPS, RFID, WiFi, or other locationing component that sends positional and/or orientation data (e.g., wirelessly) to data acquisition system 160 and/or processor 180. Such a positioning scheme might be advantageous, for example, in a "hand held" wand or other such embodiment where an operator can move the sensors around a test subject in an arbitrary manner.

At the end of the scanning process (or during the scan), test data along paths 140 and at the reference sensors 120 will be available for analysis by processor 180. Processor 180 takes this data (which only represents data for a limited number of paths in environment 102 within a particular range of time) to construct a more complete set of data representing a full scan of test subject 110, as will be discussed in further detail below.

Figure 5:
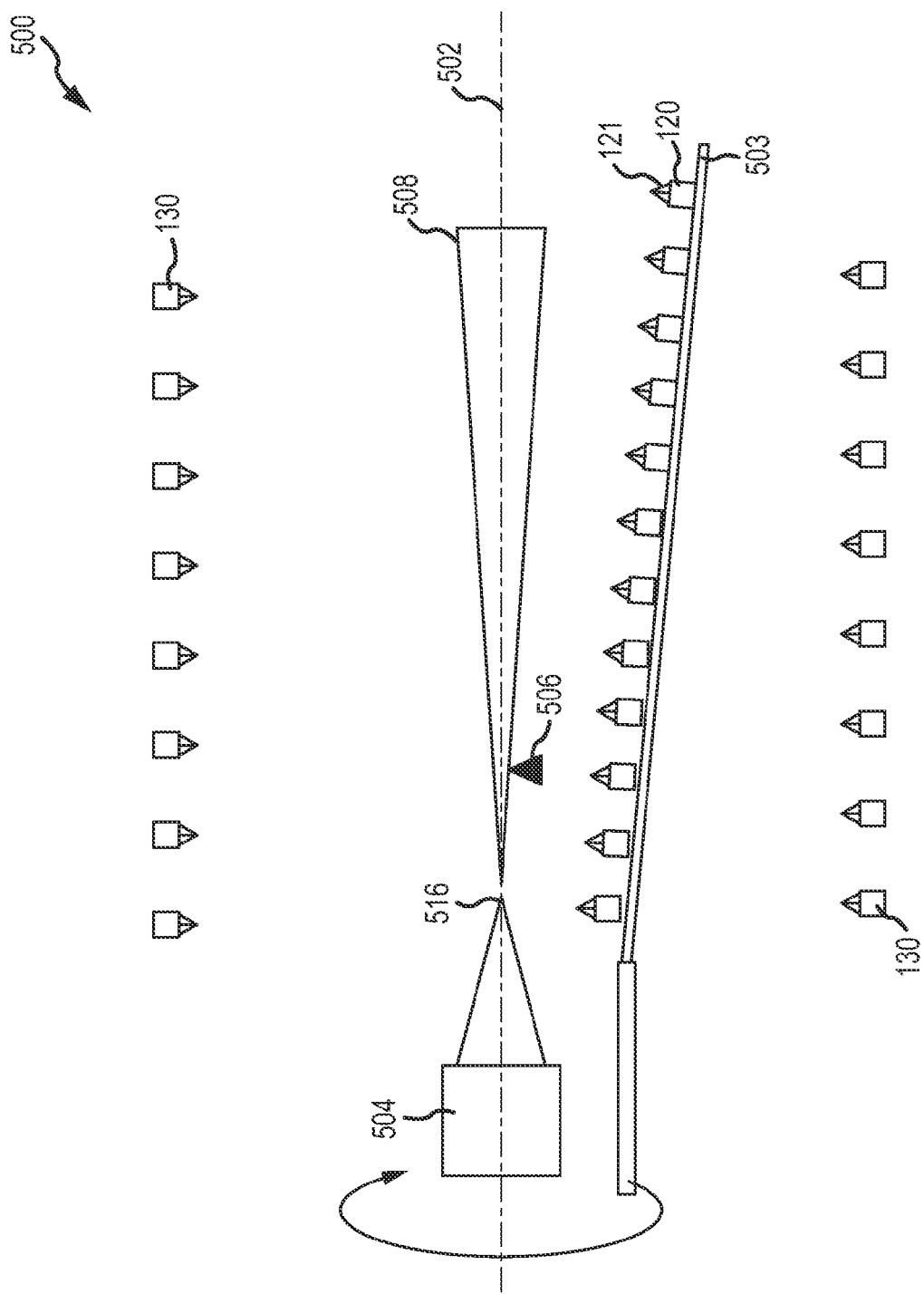
FIG. 5 is an overview of an imaging system in accordance with an exemplary embodiment of the invention.

Moveable sensors 120 may be rigidly coupled to each other (e.g., along a linear array), or may be independently controlled. In a particular embodiment, for example, moveable sensors 120 are rigidly coupled and distributed along a linear structure configured to rotate around test subject 110. More particularly, FIG. 5 depicts a scanning system 500 configured to sense sound energy produced by a jet exhaust 508 exiting the nozzle 516 of a plenum 504. FIG. 5 schematically depicts a top view of the test environment. As shown, plenum 504, nozzle 516, and jet exhaust 508 are generally coaxially oriented along an axis 502. A set of moveable sensors 120 (e.g., twelve sensors) are rigidly coupled to a structure or "boom" 503 and spaced equidistantly at intervals of approximately 10 cm.

Boom 503 (which comprises one component of robotic system 150 shown in FIG. 1) is configured to rotate around axis 502 while maintaining the orientation 121 of sensors 120 facing toward jet exhaust 508. That is, during a scanning process, boom 503 rotates partially or completely about axis 502, traversing a conical (or cylindrical) path that at least partially circumnavigates test subject 110. The resulting paths (140 in FIG. 1) described by respective moveable sensors 130 will thus consist of a series of circles, each lying within a plane orthogonal to axis 502.

While boom 503 is shown as being non-parallel to axis 502, embodiments of the invention are not so limited. Depending upon the application, and the nature of the test subject, it might be advantageous for boom 503 to be parallel to axis 502 and/or to change its orientation during a scan process. Also illustrated in FIG. 5 are a series of reference sensors 130. In one embodiment, two or more sets of linearly distributed reference sensors 130 (e.g., eight sensors per set) are employed, as shown, each having an orientation generally facing exhaust 508.

Figure 20:
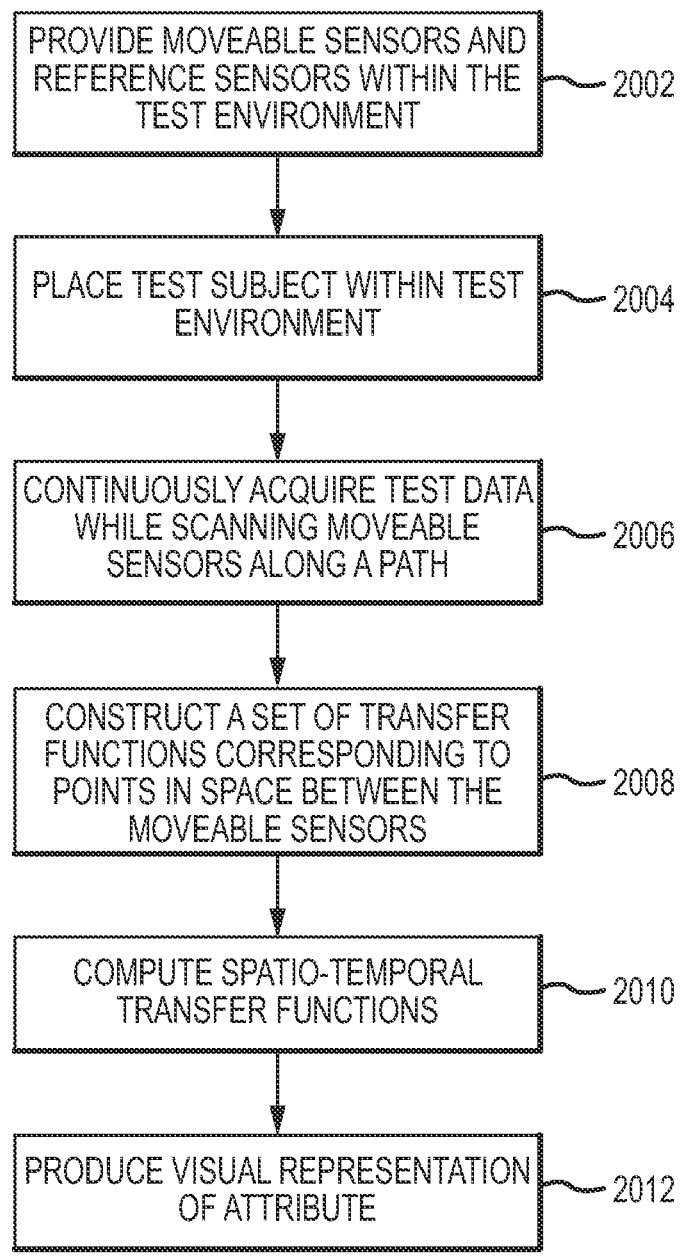
FIG. 20 is a flowchart depicting a method in accordance with one embodiment.

Referring now to FIG. 20 in combination with FIG. 1, an exemplary imaging method will now be described. In general, the experimental setup begins with the provision of various moveable sensors 120 and reference sensors 130 (Step 2002), and placement of the test subject 110 within the test environment 102. The position, orientation, and number of such sensors will vary depending upon the nature of the test subject and other factors. In many embodiments, it is desirable to utilize multiple sets of reference sensors on generally opposite sides of the test subject.

Next, in step 2006, the moveable sensors are translated and/or rotated with respect to test subject 110 using robotic system 150. At the same time, test data is continuously acquired by data acquisition system 160. This test data will include data relating to the attribute being sensed, as well as orientation and position data, as described above. The test data is then suitably stored, for example, in storage 170.

Next, in step 2008, the system (e.g., processor 180) analyzes the acquired test data and constructs transfer functions at points in space visited by moveable sensors 120 (the transfer functions relating the moveable sensors 120 to reference sensors 130). The nature of this calculation will be described in further detail below.

Next, in step 2010, processor 180 computes spatio-temporal transfer functions associated with the test data. In this way, a full set of transfer functions can be estimated between the relatively low number of reference sensors and moveable sensors at an arbitrary point in space around test subject 110. This calculation will also be described in further detail below.

Finally, in step 2012, a visual representation of the scanned attribute is produced (e.g., via display 190). This visual representation may take any desired form, including various 2D or 3D mappings. Example display types will be described below in connection with FIGS. 14 and 15.

Having thus described various sensor configurations and a general method in accordance with embodiments of the invention, an exemplary method for constructing the desired three-dimensional visualization will now be described in detail in the context of jet exhaust noise.

First, it is assumed in the following discussion that the sound source (e.g., exhaust 508, or a point source) is a statistically stationary random process. Due to the large volumetric extent of the acoustic source and a relatively small hologram array aperture, sensors 120 ("response microphones," or simply "microphones") are moved in successive scans to cover an entire hologram surface (i.e., an abstract surface encompassing exhaust 508). As the source is described by multiple mutually uncorrelated, spatially coherent sound fields, a set of N reference microphones is distributed in space to observe all the relevant phenomena. The N×N reference auto-spectral matrix contains all the spectral relationships between individual reference microphones, and is defined as:

$$C_{rr} = E[\vec{r} * \vec{r}^T], \quad (1)$$

where $\vec{r}$ is the N×1 vector of observed complex sound pressures at the reference transducers and E represents the expectation operator. On a scan-by-scan basis, a vector $\vec{p}$ is also acquired at M hologram, or response, microphones. The M×M response auto-spectral matrix is given as $$C_{pp} = E[\vec{p} * \vec{p}^T]. \quad (2)$$

$C_{pp}$ may be related to the reference auto spectral matrix $C_{rr}$ by the transfer function matrix $H_{rp} = C_{rr}^{-1} C_{rp}$ such that $$C_{pp} = H_{rp}^H C_{rr} H_{rp}. \quad (3)$$

Accurate computation of the transfer function matrices when hologram sensors are moving is discussed in greater detail below. $C_{rp}$ is defined as the N×M cross-spectral matrix that relates the reference observations (from reference sensors 130) to the hologram plane observations (from moveable sensors 120). The superscript H refers to the Hermitian, i.e., conjugate transpose operator. Over the entire scan, the signals measured by the reference microphones form a basis for the decomposition of the hologram partial fields. This basis is identified by performing a singular value decomposition on $C_{rr}$ averaged over the entire scan:

$$C_{rr,avg} = U_{avg} \Sigma V_{avg}^H = U_{avg} \Sigma_{avg} U_{avg}^H. \quad (4)$$

The subscript avg refers to the average value taken over all the individual scans. The matrices U and V are unitary (i.e., $UU^H = U^H U = I_N$) and contain the left and right singular vectors of the decomposition. In this case U=V because $C_{rr}$ is a positive semi-definite Hermitian matrix. Each singular vector is associated with a singular value in the diagonal matrix $\Sigma$, which contains the always positive singular values. The values in $\Sigma$ are ordered from high to low and give an indication of the relative strengths of the decomposed principal components. The inner product of a given singular vector with the vector of observations effectively defines a "virtual" sensor that is individually phase coherent with the partial field associated with its singular value.

A single spatially coherent sound field observed by N microphones has only one non-zero singular value. In the presence of experimental noise the other singular values would be small but non-zero. When a number of mutually incoherent phenomena are present, the number of non noise-related singular values equal the number of relevant phenomena. For any multiple, partially correlated noise sources, it is necessary that the number N be greater than the number of independent phenomena that are being observed. For a turbulent jet, the phenomena may be frequency dependent, with the number of independent modes expected to increase with decreasing characteristic length scale. It has been shown that while more than 350 hydrodynamic modes are necessary to capture only 50% of the flow fluctuation energy, a mere 24 acoustic modes can resolve 90% of the far-field acoustics. This sheds light on the number of reference transducers one may need to perform scan-based acoustical holography on a jet.

The complex stationary acoustic field, or "partial field", $\hat{P}$, that is decomposed by scan-based holography measurement is then given by $$\hat{P} = H_{rp,scan}{}^T U^*_{avg} \Sigma_{avg}^{1/2} = [U_{scan} \Sigma_{scan}^+ U_{scan}^H C_{rp,scan}]^T U^*_{avg} \Sigma_{avg}^{1/2}, \quad (5)$$

where the auto-spectral matrix $C_{PP}$ must satisfy Equation 2. The subscript scan refers to the value of each individual matrix during each scan while the superscript + refers to the generalized inverse of the singular value matrix which is obtained by setting to zero all of the singular values assumed to be unrelated to the physical phenomena being observed. Using Equation 5 a set of scans can be sewn together like a patchwork quilt to produce a phase-locked acoustic hologram for each singular value.

The interpretation of these partial fields involves complex stationary acoustic field decomposition using multi-reference acoustical holography. Partial fields are calculated by singular value or eigenvalue decomposition of the cross-spectral matrix, i.e., the matrix of cross-spectra between all channels.

Partial fields do not, in general, correspond to physical phenomena. However, partial fields can be used to project the measured data on the holography plane to other points in the source-free region (i.e., regions not scanned by sensors 130). Furthermore, as the first partial field becomes more dominant (i.e., its singular value becomes much greater than the next largest one), the partial field begins to approximate the effect of the real physical sound field. The computed partial fields are not unique, but serve as a decomposition into coherent fields that satisfy the assumptions of acoustical holography. Parameters that are computed from acoustical holography processing may then be combined, either linearly, or in an RMS sense to obtain total field properties. The notions of singular value decomposition and eigen-decomposition are equivalent and do not change the conclusions presented here. Inspection of the dominant partial fields is valuable to obtain physical understanding, but each partial field is not a coordinate system-independent physical entity. The most relevant partial field is the dominant one. It gives the most physical insight when its eigenvalue is well separated from the others.

A "partial field" is a rank one field multiplied by a complex random variable, making it mutually incoherent with any other partial field. The total acoustic field can be described by the sum of a set of mutually incoherent partial fields. One may construct an acoustic field, recorded at a number of discrete locations, as a sum of mutually incoherent coherent fields as in:

$$P = \sum_{k=0}^{N} P_k \alpha_k, \quad (6)$$

where the vector P is the total field, $P_k$ is a constant vector (observed at a given set of locations) and $\alpha_k$ is a complex random scalar such that:

$$E\alpha_i \bar{\alpha}_j = 0, \text{ for all } i \neq j, \quad (7)$$

meaning that the scalars are mutually incoherent.

For any index k, the partial field given by the random vector $P_k \alpha_k$ is a coherent pressure field upon which the normal methods of acoustical holography can be applied to project both to the far field and towards a surface enclosing the source.

The matrix of all spectra is then $$G_{PP} = E(PP^H) = \sum_{k=0}^{N} P_k \bar{P}_k \sigma_k^2, \text{ with } \sigma_k^2 = E(\alpha_k \bar{\alpha}_k). \quad (8)$$

One special case corresponds to unweighted partial fields. The spectral matrix $G_{PP}$ of Equation 8 is Hermitian, so it has an eigen-decomposition:

$$G_{PP} = V \Lambda V^H, \quad (9)$$

with a diagonal matrix of eigenvalues $\Lambda = \{\lambda_k\}$, and an eigenvector matrix $V = (\ldots V_k \ldots)$. The eigenvectors are mutually orthogonal, i.e., $V^H V = I$. It follows that the spectral matrix $G_{PP}$ could have been generated by a pressure field written as $$\tilde{P} = \sum_{k=0}^{N} V_k \beta_k, \text{ where } E(\beta_k \bar{\beta}_k) = \lambda_k. \quad (10)$$

Each such $V_k \beta_k$, where $\beta_k$ is a complex random scalar, is a coherent field, and we can apply the projection methods of acoustical holography to extend this field toward and away from the source. The total extended field is then clearly the sum of these fields.

It should be noted that the eigenvectors $V_k$ are mutually orthogonal, whereas the same cannot be said about the partial fields $P_k$ of Equation 6. The physical interpretation of the partial fields $V_k$ should therefore be taken with some reservations; their value lies in that they provide partial fields that are amenable to acoustical holography and sum up to the total field.

Often, instead of a complete autospectral matrix, we may be considering a submatrix of $G_{PP}$ obtained by selecting a crossspectral matrix $G_{PS}$ where S is a subset of the channels in P. Instead of an eigen-decomposition we will use a singular value decomposition $$G_{PS} = \tilde{V} \Sigma \tilde{U}^H, \tag{11}$$

where $\tilde{V}$ and $\tilde{U}$ are matrices with unitary columns (mutually orthogonal), and $\Sigma$ is a quasi-diagonal matrix of non-negative singular values. The partial fields are then represented by the columns of $\tilde{V}$. In the special case where P=S, Equation 11 reduces to Equation 9.

One can extract eigenvectors (partial fields) in any way, and they will be directly amenable to acoustical holography computations, which may then be subsequently superposed linearly (projected towards and away from the source). On the other hand, visualization of the dominant partial field(s) gives valuable insight into the nature of the dominant coherent phenomena at a given frequency as long as we understand that the computed fields are linear combinations of the underlying physical sources.

For shock-containing military jets, preliminary sizing estimates based upon typical aircraft engine jet geometries and documented array spacing suggests that meeting the highest frequency requirements of interest (O[20 kHz]) by generating conventional holograms over a typical hologram plane is impractical. For example, others have presented data at 1 kHz using 16 scanning and 48 reference microphones in a cylindrical arrangement for a 0.8 cm burner nozzle jet source operating at Mach 0.26. Array microphones are scanned at axial increments of 3.0 cm (about 11 points per 1 kHz wavelength), and a circumferential (arc) spacing of 6.0 cm, (about 6 points per 1 kHz wavelength). When scaled to 20 kHz, this corresponds to a point spacing of roughly 3 mm, requiring about $10^5$ scans over the entire assumed source plane. For data records in the range of 1 to 20 seconds, this might correspond to anywhere between 30 and 600 hours for data acquisition. Hence it is crucial to reduce the number of scan points.

In accordance with certain embodiments, two signal processing techniques are used as a means to reduce both scan time and sensor count. First, transfer functions are constructed at points in space between continuously moving microphones and fixed reference transducers. The methodology includes averaging capability by employing Chebyshev spacing of points upstream and downstream of the point of interest as the microphone passes through. Second, a more efficient computation of spatio-temporal transfer functions includes canonical coherences that uses all spectral data to narrow the state space down to the area where one only looks at the phenomena that are mutually coherent between the references and the response transducers.

As previously mentioned, some stationary measurement situations entail the phase correct estimation of spectral matrices for a large number of transducers locations distributed over a geometry or test subject. Quite often, it is infeasible to measure all locations simultaneously due to financial or physical constraints. Stationarity allows one to perform measurements at arbitrary time points; but in order to obtain phase coherency between data sets acquired at different instants of time, the system must be able to estimate transfer functions between a fixed set of transducers and the roving transducers at any desired position of the roving transducers.

Current approaches to roving acquisition use a robot to perform a series of moves to fixed locations and dwell there until sufficient averaging has taken place. The start and stop motion induce vibration transients, which add to the appreciable amount of time expended averaging. In contrast, the present invention involves continuously moving transducers with, for example, real time position feedback. The assumption is that the transfer functions are smooth functions of position which allows the system to use averaging information in a geometric neighborhood of each desired measurement location. The smoothness assumption put limits on the scan speed to a required degree of averaging. It is worth noting that continuous motion results in much smaller vibration and positioning transients than the traditional start and stop scheme.

Figure 2:
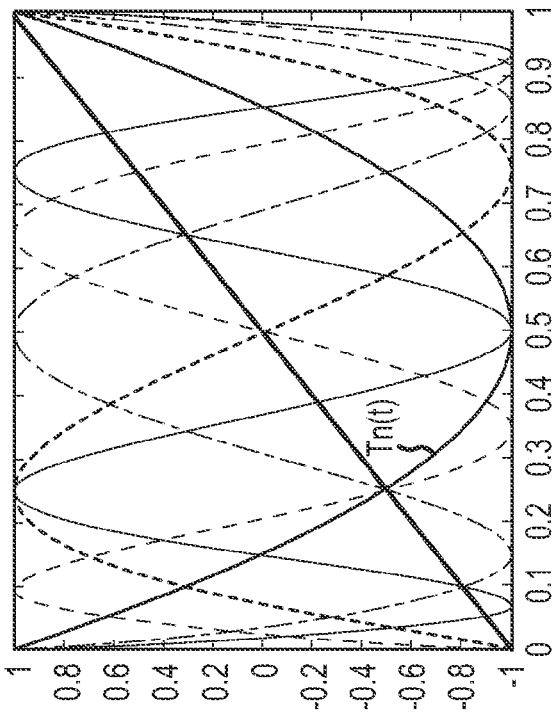
FIG. 2 is graph depicting an oscillatory function useful in describing the present invention.
Figure 3:
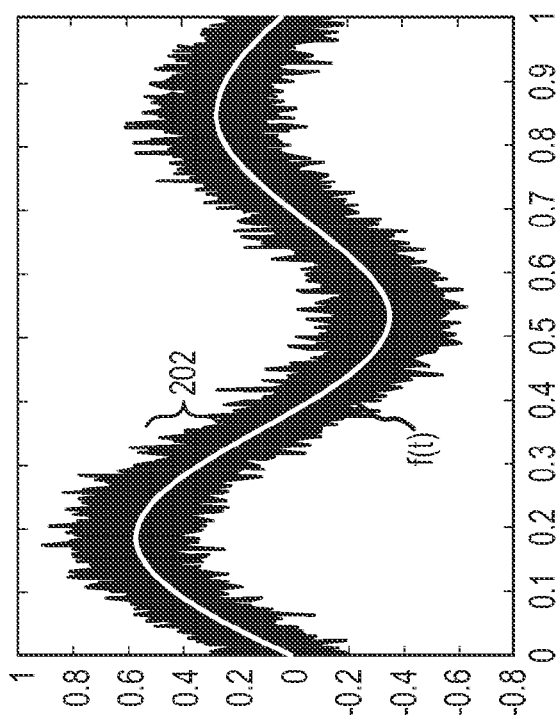
FIG. 3 is a graph depicting a set of Chebyshev polynomials associated with the graph of FIG. 1.
Figure 4:
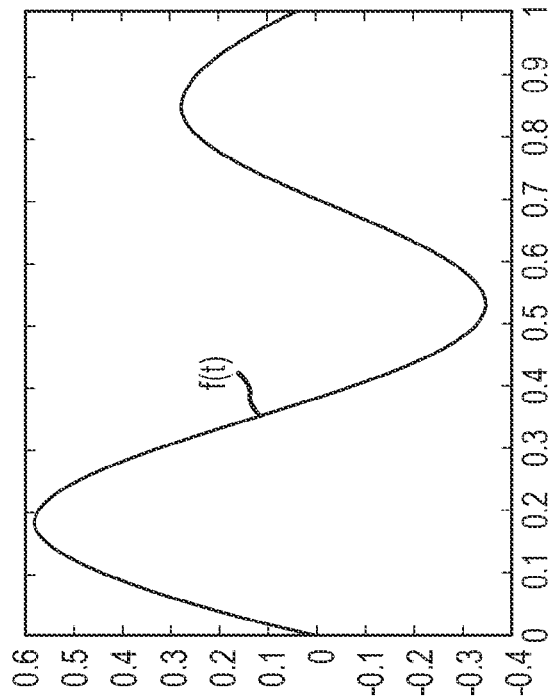
FIG. 4 is a graph depicting a low wavenumber function associated with FIG. 2.

FIGS. 2-4 depict various graphs useful in understanding the present invention, with the horizontal axes corresponding to time (or normalized time) t, and the vertical axes corresponding to normalized or non-normalized sound pressure (e.g., in Pascals) or some other attribute of the test subject. Referring to FIG. 2, consider the estimation of a function $f(t)$ which is defined on the interval [0 1]. The function has a certain oscillatory nature. In this example, the function may be measured at any position, but with a random measurement error 202 as shown. To avoid aliasing of data, the sampling theorem states that the system must sample faster than twice per wave length. In this experiment, then, assume the system will sample the noisy data at a set of locations within this interval in order to estimate an accurate value of the underlying function at enough points to avoid aliasing.

Expand the function to be estimated into a finite sum of Chebyshev polynomials $T_n(t)$, as shown in FIG. 3. The mathematical expression is then:

$$f(t) = \sum_{n=0}^{N} c_n T_n(t) + \varepsilon(t), \tag{12}$$

where $\varepsilon(t)$ is the error, consisting of estimation error and possible lack of fit to the finite set of Chebyshev basis functions. The Chebyshev polynomials are selected in this case since any continuous function can be uniformly approximated with the basis of Chebyshev polynomials. Also, if the underlying function possesses a modicum of smoothness, the rate of convergence will be exponential, unlike polynomial approximations. A reasonably optimal selection of sampling points for a given number N+1 of sampling points is:

$$t_k = 0.5\left(1 - \cos\left[\frac{(2k+1)\pi}{2(N+1)}\right]\right) \quad k = 0, 1, \ldots, N, \tag{13}$$

which is seen to have an uneven spacing of the interval with a higher density at either end. The corresponding interpolating function is given by:

$$F(t) = \sum_{n=0}^{N} {}' c_n T_n(t), \tag{14}$$

where the prime notation on the sum means that the first term $c_0T_0$ should be divided by 0.5. The interpolation coefficients are given by:

$$c_n = \frac{2}{N+1} \sum_{k=0}^{N} \tilde{f}(t_k) T_n(t_k), \qquad (15)$$

where $\tilde{f}(t_k)$ is the measured function, including measurement noise.

If N+1 sampling points are used, and the underlying function is smooth enough to be approximated by the first K+1 terms, then, by using the estimate:

$$F^K(t) = \sum_{n=0}^{K} {}' c_n T_n(t), \qquad (16)$$

it can be seen that an effective averaging comparing to N–K samples results, with a standard deviation shrinking with $$\frac{1}{\sqrt{N-K}}$$

as the number of sampling points grows. There is a pragmatic statistical upper limit to the number of sampling points since it is desirable that the error in adjacent sampling points be uncorrelated for effective averaging. FIG. 4 demonstrates that the underlying low wavenumber function can be well approximated using only a few (8) Chebyshev polynomials, despite the presence of noise shown in FIG. 2.

If the sensor position is parameterized as a function of elapsed time, then, for any time point with its corresponding position we may construct a small interval around that time point where the underlying function will have a limited number of cycles, preferably only a segment of a cycle. The estimation of Chebyshev expansion coefficients gives us then an interpolation function which may be evaluated to give us an averaged estimate at the center point. Inspection of the derivation of the estimation procedure tells us that the function to be estimated need not be a scalar, it may also be any tensor or matrix, such as a matrix of spectra and cross spectra.

This approach gives us a very high resolution of spectral estimation along a path of robotic motion. To achieve sufficient resolution on a surface, however, the paths must be close enough that we can interpolate without aliasing between paths. Unless additional assumptions are used, the distance between scan lines must be less than half the wavelength in the direction normal to the scan lines. Our scan patterns are therefore better interpreted as parallel lines in some curvilinear geometry rather than giving rise to a regular set of cells.

The following section describes transfer function estimation through canonical coherence analysis. The goal is to estimate transfer functions between a fixed set of reference transducers and a set of roving response transducers at an arbitrary point on the scan path. It is important to note that these transfer functions are a function of geometry as well as of the stationary field that we have measured, so that we understand that we are describing correlation, but not causality. The reference sensors 130 are preferably chosen so as to capture all or substantially all coherent phenomena of the field in question, such that knowing the field at the reference transducers, the system can construct the corresponding field at all the response transducer point with the help of the transfer functions.

Typically, the system should include at least as many reference sensors 130 as there are mutually incoherent sources in the field. Since different frequency bands tend to have a different number of sources, and also some sources are not measurable at all transducer locations, it is desirable to include a redundant set of reference transducers. This redundancy leads to numerical problems in the conventional algorithms used for transfer function estimation.

For this example, denote the random vector of reference transducers at a given frequency by X, and the random vector of response transducers by Y. The spectral matrices that are acquired are defined as:

$$G_{XX}=E(XX^H),\ G_{XY}=G_{YX}{}^H=E(XY^H),\ \text{and}\ G_{YY}=E(YY^H), \qquad (17)$$

where the expectation operator E(.) is approximated by averaging in the statistical sense.

The transfer function is defined as a matrix H, such that:

$$Y = HX, \qquad (18)$$

and by postmultiplying by $X^H$ and taking expectations we receive:

$$G_{YX} = HG_{XX}. \qquad (19)$$

Solving for the transfer function H:

$$H = G_{YX} G_{XX}{}^+, \qquad (20)$$

where the plus sign denotes a suitable generalized inverse. The autospectral matrix $G_{XX}$ of the references is positive semidefinite hermitian and square, but is typically numerically ill conditioned, such that traditional estimation techniques find a generalized inverse by singular value decomposition (SVD), or other regularization techniques. Inspection of the traditional solution also shows that $G_{YY}$ is not being used, which means that the information in parts of the acquired data is being ignored.

We shall construct two sets of vectors, $a_i$ and $b_i$, such that the random scalars $a_i{}^H X$ and $b_j{}^H Y$ are incoherent for i≠j and the coherence between $a_i{}^H X$ and $b_i{}^H Y$ is not less than the coherence between $a_j{}^H X$ and $b_j{}^H Y$ for all i<j. The solution is found by solving the eigenvalue problem:

$$G_{XX} a \lambda = G_{XY} G_{YY}{}^+ G_{YX} a, \qquad (21)$$

where the generalized inverse is any that satisfies $A=AA^+A$. Select $a_i$ as an eigenvector which corresponds to a non zero and finite eigenvalue $\lambda_1$, and sort the eigensolutions such that $\lambda_i \geq \lambda_j$ for i<j. The corresponding $b_i$ vectors are given by $G_{YY}{}^+ G_{YX} a_i$. The coherence between $a_i{}^H X$ and $b_i{}^H Y$ is $\lambda_i$ and is called a canonical coherence. We normalize the eigenvectors such that $a_i{}^H G_{XX} a_i = 1$, which implies that $a_i{}^H G_{XY} G_{YY}{}^+ G_{YX} a_i = \lambda_i$.

The derivation of this method is based on arguments associated with the optimization of Rayleigh quotients. It can be shown that the same solutions may be found by interchanging the roles of X and Y even when the two sets of transducers are of a different size.

By mapping the physical transducer measurements into canonical coordinates $x_i = a_i{}^H X$ and $y_i = b_i{}^H Y$, the task of estimating transfer functions is reduced to finding an optimal scalar transfer function for each canonical coordinate, whereupon we may transform back to the physical coordinates.

It can shown that the spectral matrix of:

$$\left\{ \begin{array}{c} x_i \\ y_i \end{array} \right\} \text{ is } \begin{pmatrix} 1 & \lambda_i \\ \lambda_i & \lambda_i \end{pmatrix}.$$

The standard estimates are then:

$$H_1 = \lambda_i, \quad (22)$$

$$H_2 = 1, \quad (23)$$

and $$H_v = \sqrt{H_1 H_2} = \sqrt{\lambda_i}. \quad (24)$$

It is well known in practice from structural modal analysis that the $H_1$ is optimal when there is no noise on the input, the $H_2$ is optimal when there is no noise on the output, and that $H_v$ is optimal when there is noise on both references and responses. We shall therefore choose $H_v$ as given by Equation 24. It can be shown that $|H_1| \leq |H_v| \leq |H_2|$.

With the normal scaling convention, it can be shown that $b_i^H G_{YY} b_i = \lambda_i$, so that the mapping from the physical reference to canonical coordinate i through the $H_v$ transfer functions and then to the physical response is given by:

$$\lambda_i^{-1} G_{YY} G_{YY}^+ G_{YX} a_i \sqrt{\lambda_i} a_i^H = \lambda_i^{1/2} G_{YY} G_{YY}^+ G_{YX} a_i a_i^H. \quad (25)$$

Equation 25 shows the transfer function for canonical coordinate number i, so it follows by combining all nonzero canonical coordinates that the total transfer function is:

$$G_{YY} G_{YY}^+ G_{YX} A \Lambda^{1/2} A^H, \quad (26)$$

where $\Lambda$ is the diagonal matrix of nonzero finite eigenvalues of Equation 21 and A is the column matrix of the normalized eigenvectors. This transfer function estimate uses sufficient statistics, i.e., does not ignore the information in $G_{YY}$, and is also robust in the presence of noise both on the references and the responses. Another benefit is that failed transducers among the references will be ignored since they cannot be coherent with any other transducer in the responses.

EXPERIMENTAL SETUP

Experiments relating to the conceptual diagram of FIG. 5 were conducted in a facility that uses a Kaeser air compressor to pressurize two 18.9 m³ tanks to a pressure of 1.34 MPa (195 psig). The compressed air passes through a dryer and is then piped to a plenum before exhausting through a model nozzle for point source 506 in the facility's anechoic chamber. Nozzle diameters up to 1 inch (0.0254 m) are typically used, though the experimental results presented herein focus on a 0.7 inch (0.0178 m) diameter jet.

Inside the anechoic chamber, fiberglass wedges are attached to each wall, resulting in chamber wedge-to-wedge dimensions of 5.02×6.04×2.79 m (16.5×19.82×9.15 ft) and a cutoff frequency of 250 Hz. An exhaust system, beginning on the wall opposing the plenum, ingests the flow in order to maintain approximately constant ambient conditions inside the chamber.

A robotically controlled acoustical holography array (e.g., 120 and 503) takes measurements in the hydrodynamic and/or acoustic near-field of laboratory-scale jets in the facility. The array consisted of an approximately 4 ft (1.22 m) long boom that holds twelve Bruel and Kjaer (B&K) 4944A microphones. These twelve array (i.e. "hologram") sensors are spaced 4 inches (10.2 cm) apart in a straight line, as pictured in FIG. 5

The boom 503 is connected to a linear track that allows it to move in the direction aligned with the microphones. The boom and linear track are mounted on a bracket assembly that is in turn held by a machined cylinder mounted on a bearing around the jet (not shown). A toothed gear around the cylinder is connected to another motor to allow the entire assembly to rotate. Therefore the array of microphones can be moved in two degrees of freedom, translational (along the sensor line) and rotational. Additionally, a pin allows the bracket assembly to be set at a range of arbitrary angles relative to the jet centerline, allowing data to be acquired on conical or cylindrical surfaces. Microphone orientation is defined in a cylindrical coordinate system relative to the center of the nozzle with the microphone closest to the jet located at approximately 2¼ inches (5.7 cm) axially from the jet nozzle exit plane and 2 inches (5.1 cm) radially from the jet centerline in the conical configuration.

The full acoustical holography experiment contains 24 B&K 4944A reference microphones located on three linear arrays of eight microphones. Thus the total number of microphones in the experiment equals 36. The reference microphone arrays were assembled using supports constructed of perforated angles and covered with acoustic foam.

Full scans were conducted over a 315 degree arc on the hologram surface. The 45 degree sector located right below the jet was a "no-scan" zone due to array stop requirements. Stationary microphone ("fixed-index") acquisitions were taken at spacings of one inch (2.54 cm) in the array translation direction and 22.5 degrees in the circumferential direction. Therefore each microphone in the array visited a total of 60 points (4 linear×15 circumferential), for a total fixed-index grid of 48×15 points. Additionally, moving scans were taken through each line of translational and circumferential grid points. Linear scans were taken at a speed of 1.0 cm per second, while moving scans were taken at 12 degrees per second.

A point source (506) was also constructed from a midrange speaker in an enclosure and connected to a long flexible tube with a nozzle at the end in order to validate the continuous scan technique on a sound source with near-perfect spatial coherence before examining acoustic holograms obtained from jets. In subsequent paragraphs, results are presented for both acoustical holography scans of the point source and of a supersonic, imperfectly expanded jet with a strong screech tone.

The results suggest that the techniques described above allow the system to measure high-resolution acoustic holograms of the dominant partial field of a noise source. Two examples are described: a point source that emits a strong, spatially coherent tone, and an imperfectly expanded supersonic jet. Data are presented for stationary hologram acquisitions taken on a fixed-index grid as well as continuously moving microphone acquisitions taken along a single line in the array translational direction.

Experiment 1

Figure 6:
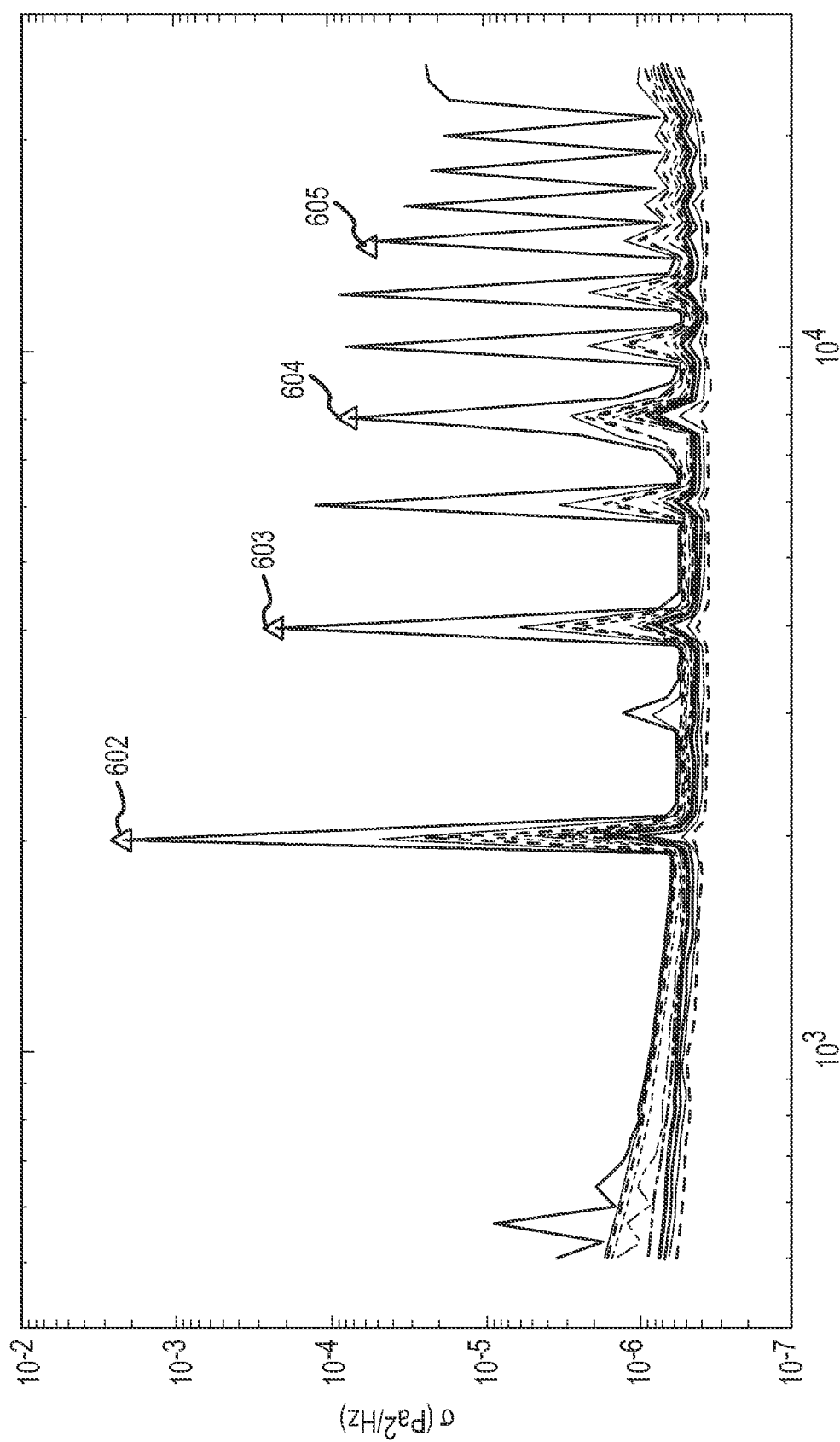
FIG. 6 is a graph depicting singular values of a reference auto-spectral matrix for a point-source scan.

In accordance with the present invention, a point source 506 was scanned with the jet nozzle 516 turned off. The end of the point source nozzle was located about 14 inches (35.6 cm) downstream of the jet nozzle exit plane, as pictured in FIG. 5. A full scan of grid points was made over an 8 inch (20.3 cm) radius cylindrical surface around the point source located near the 14 inch (35.6 cm) axial coordinate (i.e., with the boom 503 of FIG. 5 positioned parallel to axis 502). The point source produced a strong 2.0 kHz tone with higher harmonic frequencies, as indicated by the singular values of $C_{rr}$ plotted as a function of $\frac{1}{12}^{th}$ octave band frequency in FIG. 6 Note that the amplitude of $C_{rr}$ at each frequency is converted to a spectral density in this figure, so the singular values have units of $Pa^2/Hz$. The triangular symbols (602-605) shown on the highest singular value at 2.0, 4.0, 8.0 and 14.0 kHz represent the dominant partial fields at those frequencies.

Figure 7:
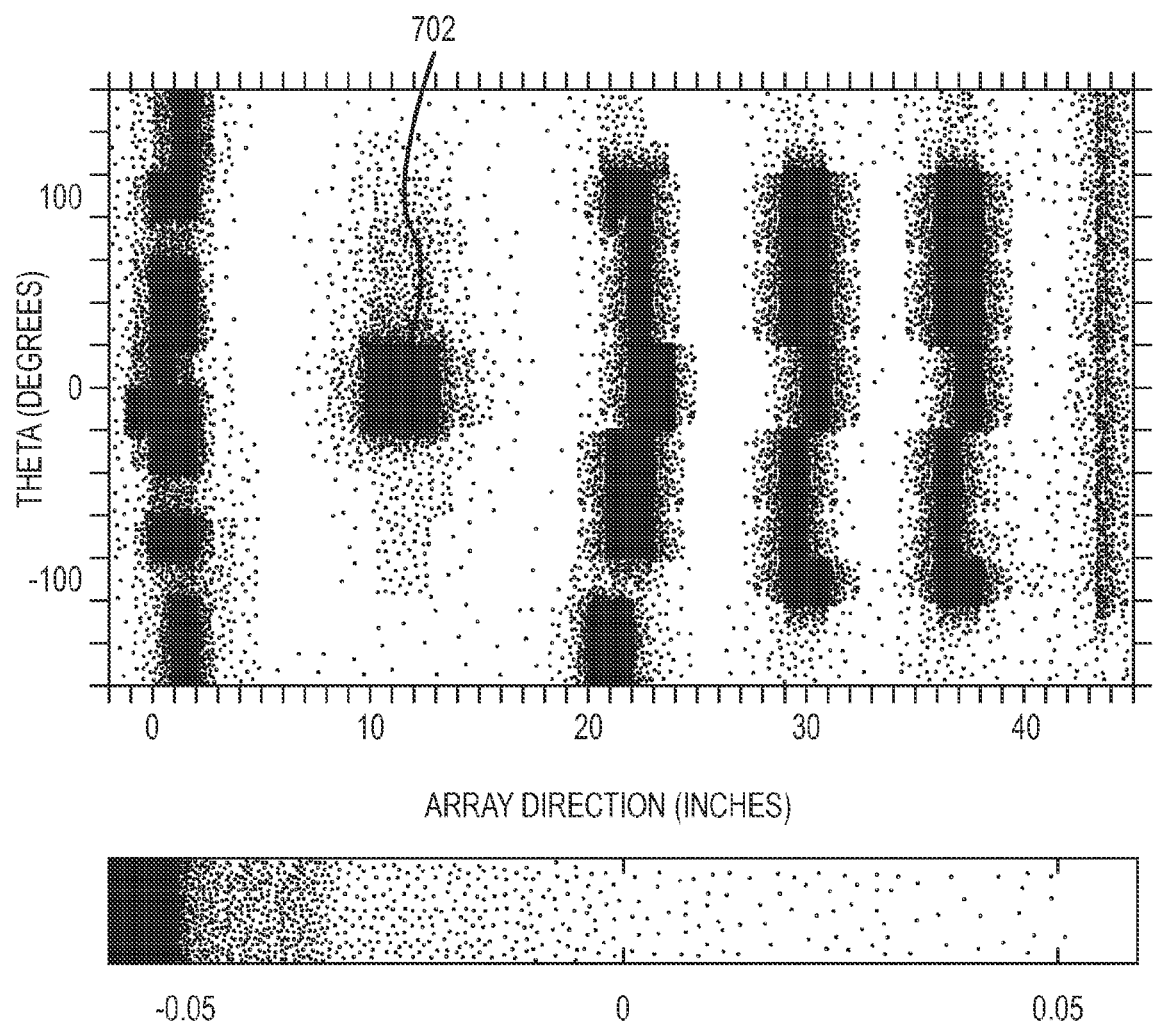
FIG. 7 is a 2D unwrapped representation of a dominant partial field for a point-source.
Figure 8:
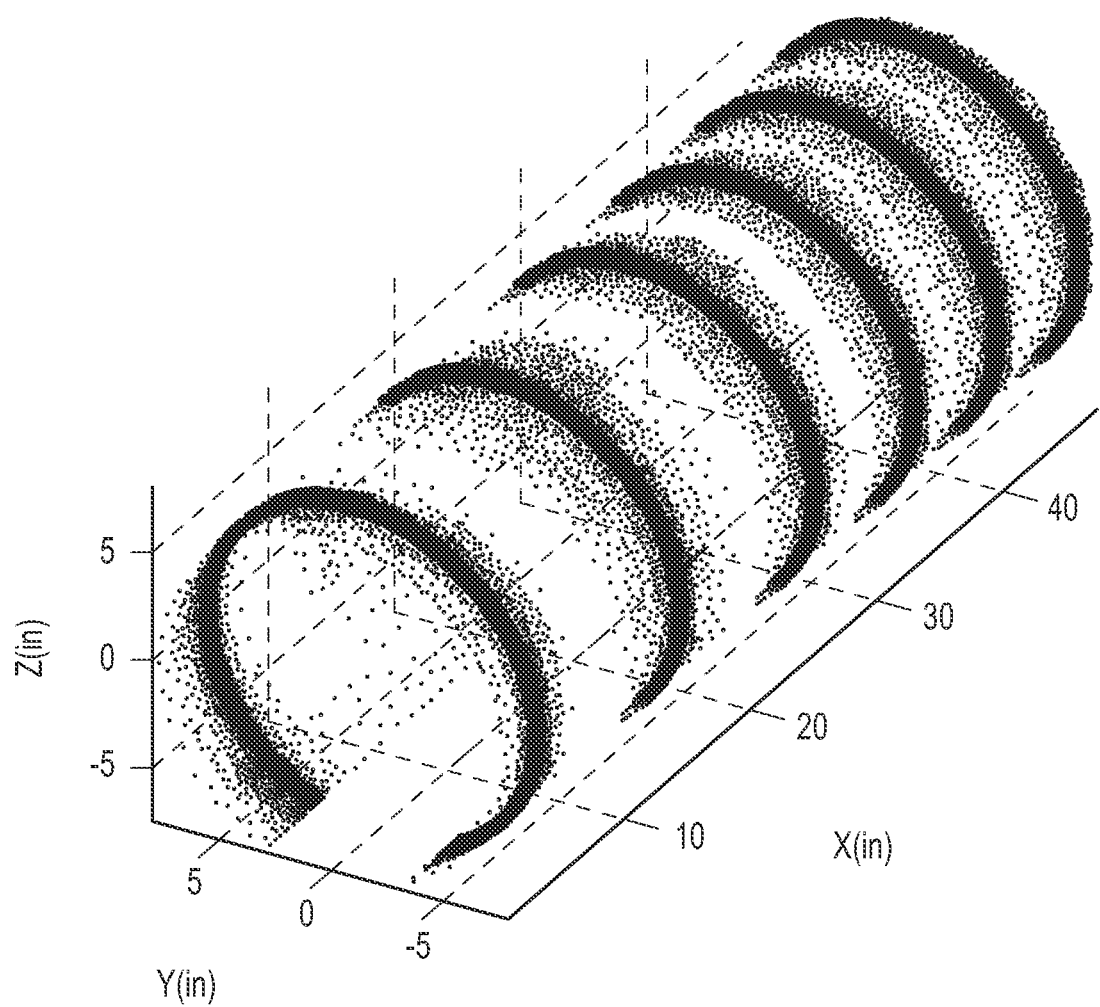
FIG. 8 is hologram cylinder corresponding to the 2D representation of FIG. 7.
Figure 9:
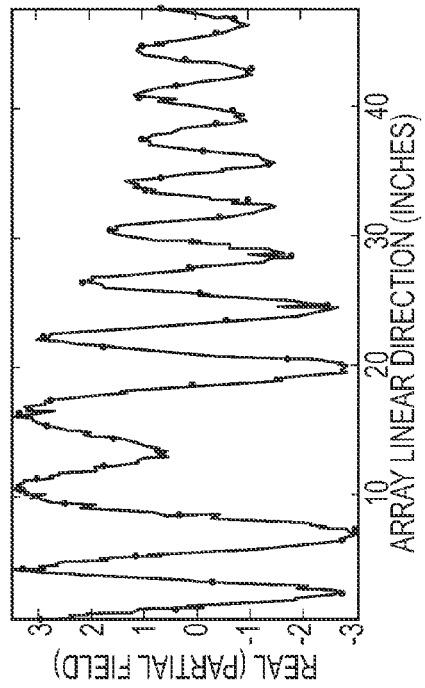
FIG. 9 is a graph depicting the real part of a dominant partial field in accordance with a 2 kHz tone.
Figure 10:
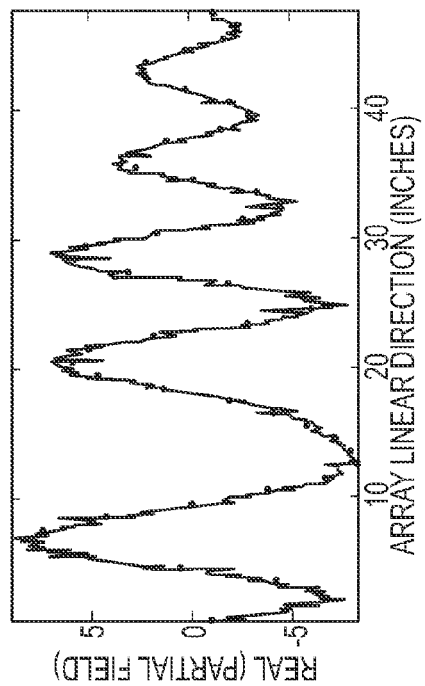
FIG. 10 is a graph as shown in FIG. 9 in accordance with a 4 kHz tone.
Figure 11:
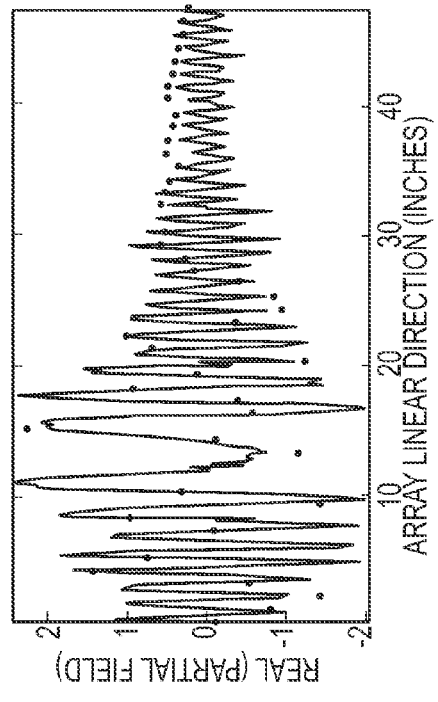
FIG. 11 is a graph as shown in FIG. 9 in accordance with a 8 kHz tone.
Figure 12:
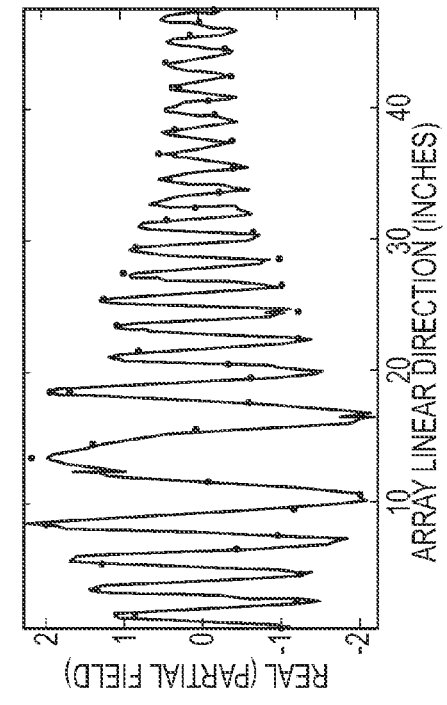
FIG. 12 is a graph as shown in FIG. 9 in accordance with a 14 kHz tone.

FIG. 7 presents the real part of the dominant complex partial field at 2 kHz over the entire fixed-index grid with spacing of one inch (2.54 cm) in the array direction and 22.5 degrees in the circumferential direction. Specifically, FIG. 7 presents the partial field in a two-dimensional projection in the translational (abscissa)-circumferential (ordinate) plane. The same partial field is shown in FIG. 8 on the cylindrical hologram surface. The origin of the coordinate system is the center of the nozzle 506 shown in FIG. 5, with the jet axis in the positive x-direction and the vertical axis in the positive z-direction.

The ovoid shape 702 in the planar representation of the partial field (FIG. 7) is centered around the location of the point source, and shows that there is some angular variation of the amplitude and phase of this dominant partial field. This is mostly due to the fact that the sound source used in the test is only an approximate point source, but might also be due to some slight misalignment of the scanning array.

The wavefronts show that the magnitude decays away from the point source axial station and the obtained wavelength is consistent with the expected wavelength of sound of this frequency traveling at the ambient sound speed. Since the field is complex it can be animated by multiplication by a time harmonic function $e^{i\omega t}$. The arrows indicate that the partial field measurement is able to capture the propagation direction of the acoustic waves: away from the point source in this example.

FIGS. 9-12 present the real part of the measured dominant partial field at 2 kHz, 4 kHz, 8 kHz, and 14 kHz, respectively, along a continuous line parallel to the axis of the hologram cylinder and directly above the point source 506 (i.e. θ=0°). Circular points indicate data acquired from microphones during stationary acquisitions, while the dark lines represent the constructed partial field from the continuously moving array.

For the stationary scans, measurement locations were spaced one inch apart, implying that the spatial Nyquist frequency based on two points per wavelength is 6.7 kHz. At frequencies above this value it would be expected that the stationary scans would result in aliasing of data, which is clear from the data in FIGS. 11 and 12. The partial field values obtained from the continuous scan fits fairly closely to the ones obtained with the fixed scan, with only small discrepancies between the magnitude of the two. Thus it can be inferred that the continuously moving microphone transfer function estimation technique can increase spatial resolution with a fixed number of sensors that would otherwise be constrained by their microphone spacing or their array aperture size.

Experiment 2

Figure 13:
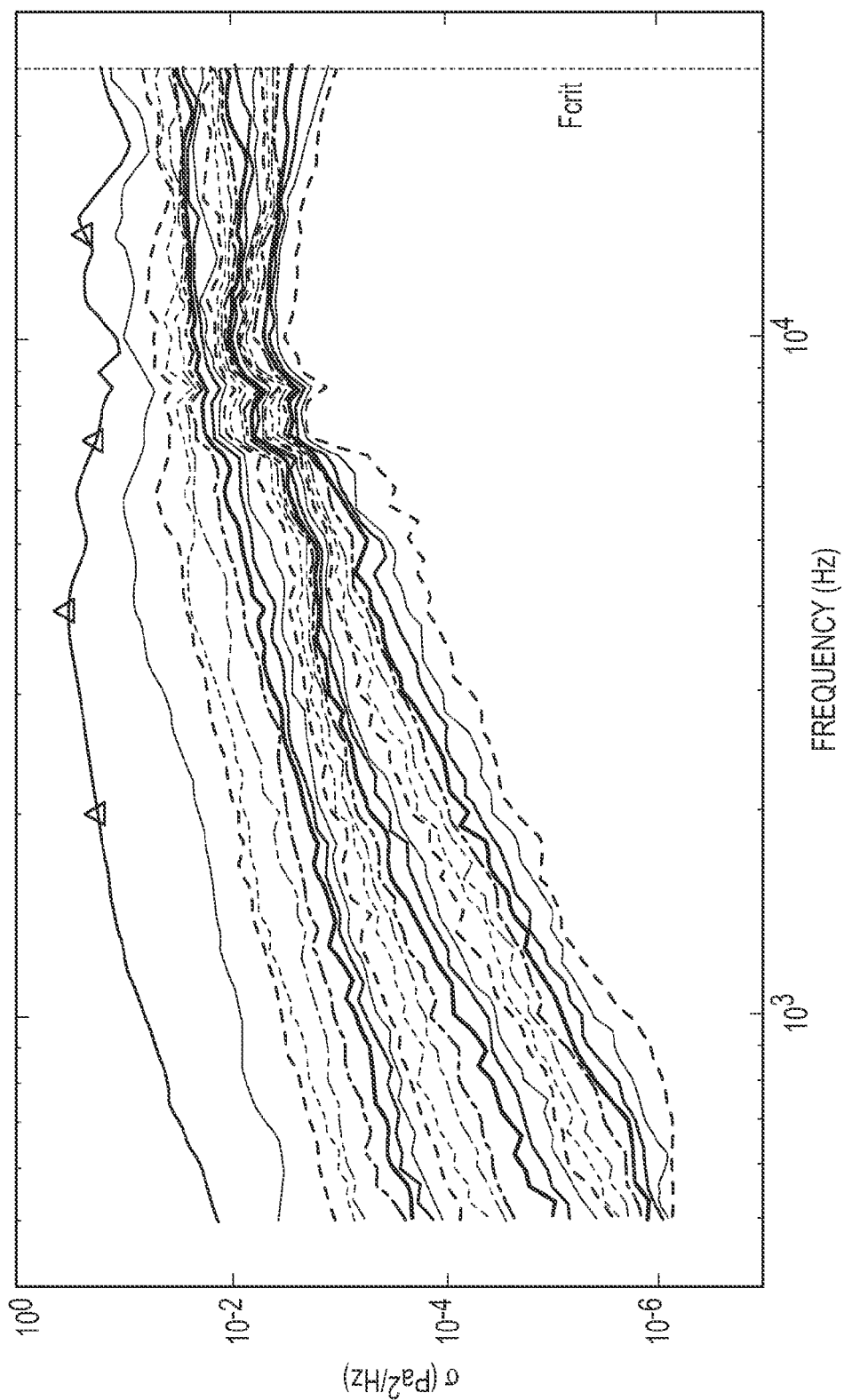
FIG. 13 is a graph depicting singular values of a reference auto-spectral matrix for a shock-containing jet scan in accordance with one embodiment.

A 0.7 inch (1.78 cm) jet nozzle with design Mach number ($M_d$) of 1.3 was run in an underexpanded state with a stagnation to ambient nozzle pressure ratio corresponding to a perfectly expanded jet Mach number ($M_j$) of 1.5. The holography array was set at a 10 degree half angle to sweep a conical surface, as pictured in FIG. 5. The same types of scan were performed on the supersonic jet as on the point source described above. FIG. 13 presents the singular values of $C_{rr}$ as a function of $\frac{1}{12}^{th}$ octave center frequency. Again, as with the point source, the singular values are presented in units of spectral density, i.e., $Pa^2/Hz$. The critical frequency associated with a Strouhal number of unity is indicated by the dashed vertical blue line, and corresponds to approximately 25 kHz. Data are shown in this section for the dominant partial field associated with the triangular symbols at 2.0, 4.0, 7.1, and 14.2 kHz. It is worth noting that the dominant singular value is as much as an order of magnitude larger than the second singular value at certain low frequencies. Also, over most frequencies the first four to six singular values appear to be well over an order of magnitude larger than the remaining singular values, suggesting that over 90% of the acoustic energy can be described by these few associated partial fields. At lower frequencies the noise mechanism is understood to be due to instability waves associated with large turbulence structures, while the hump that peaks near 14 kHz is broadband shock associated noise (BBSAN), as indicated in the figure. The next two figures examine the quality of the data of the dominant partial field for these noise mechanisms.

Figure 14:
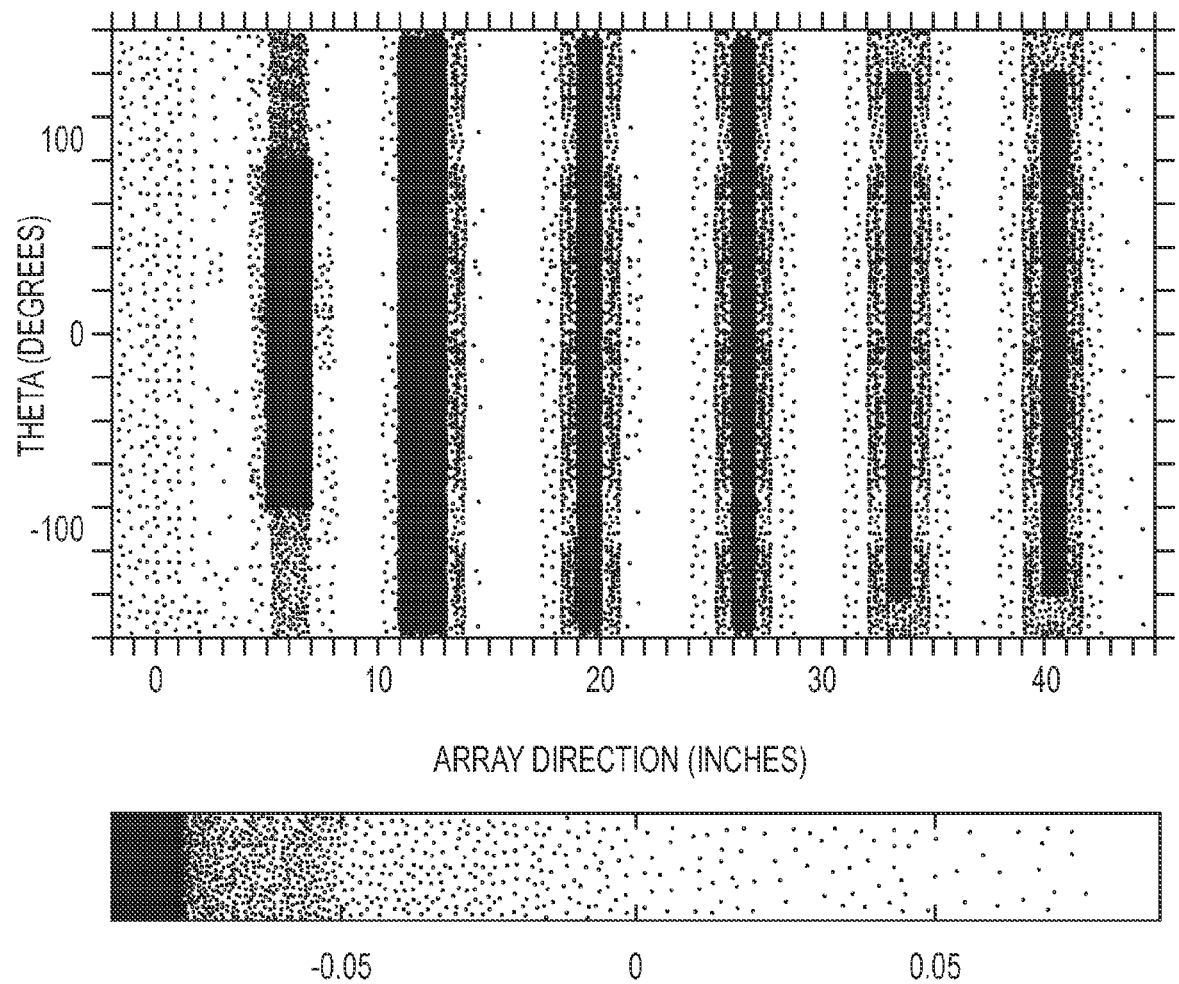
FIG. 14 is a 2D unwrapped representation of a dominant partial field for a shock-containing jet scan in accordance with one embodiment.
Figure 15:
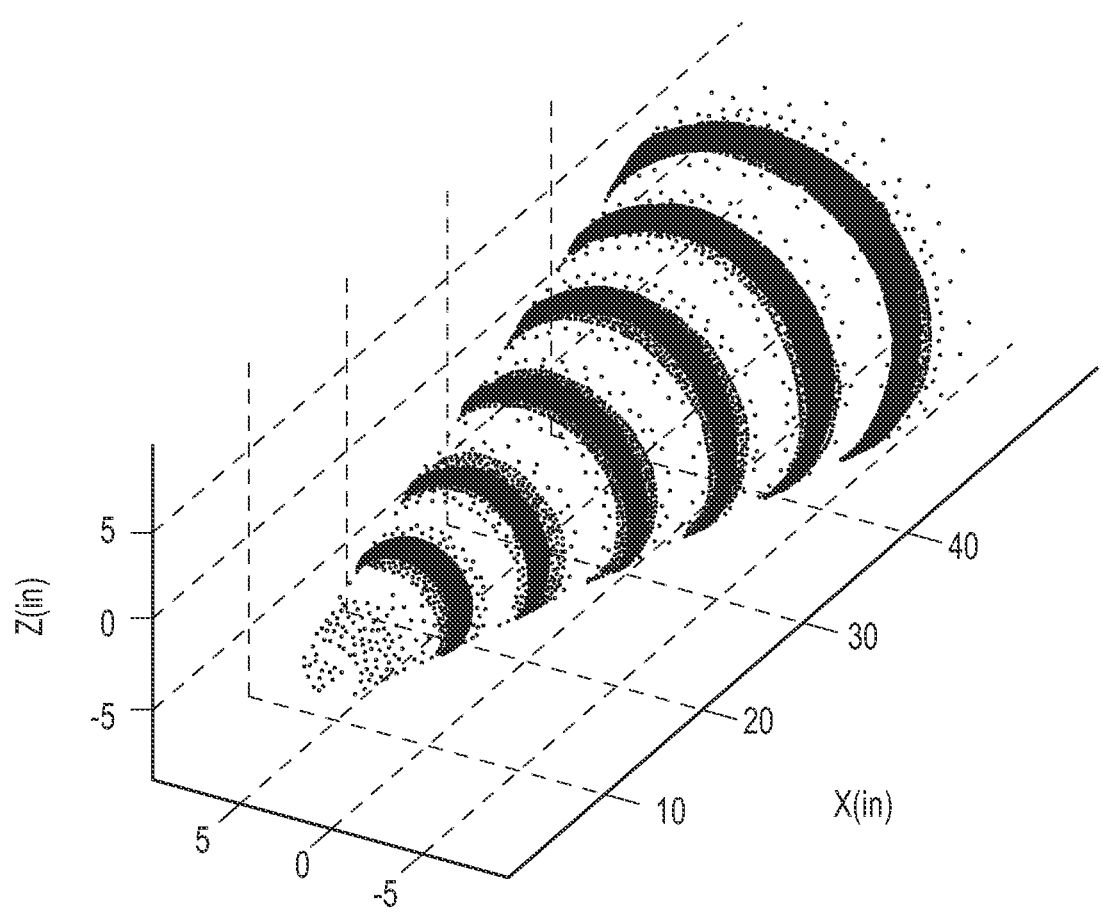
FIG. 15 is a hologram cone corresponding to the representation of FIG. 14.
Figure 16:
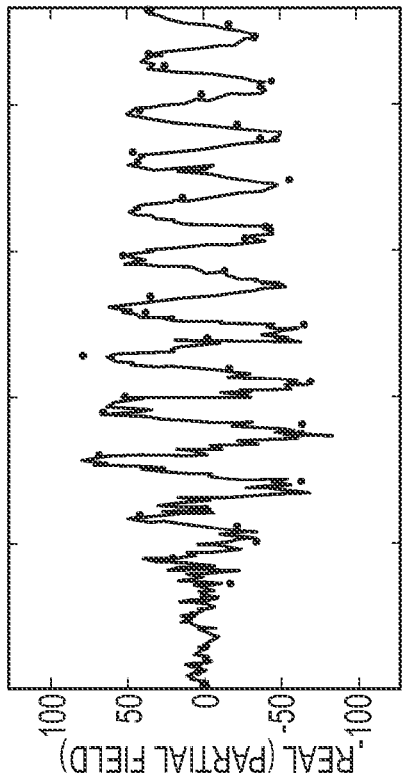
FIG. 16 is a graph depicting the real part of a dominant partial field for shock containing an underexpanded jet at 2 kHz.
Figure 17:
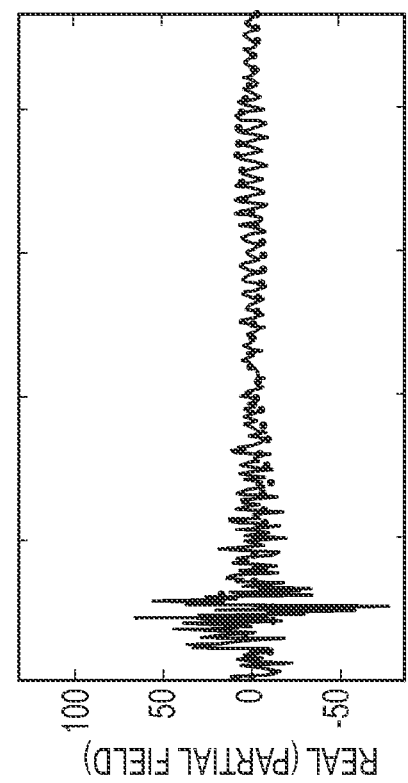
FIG. 17 is a graph depicting the real part of a dominant partial field for shock containing an underexpanded jet at 4 kHz.
Figure 18:
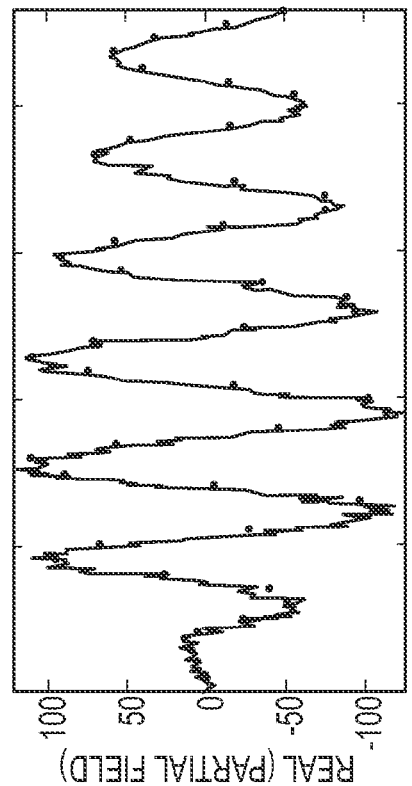
FIG. 18 is a graph depicting the real part of a dominant partial field for shock containing an underexpanded jet at 7.1 kHz.
Figure 19:
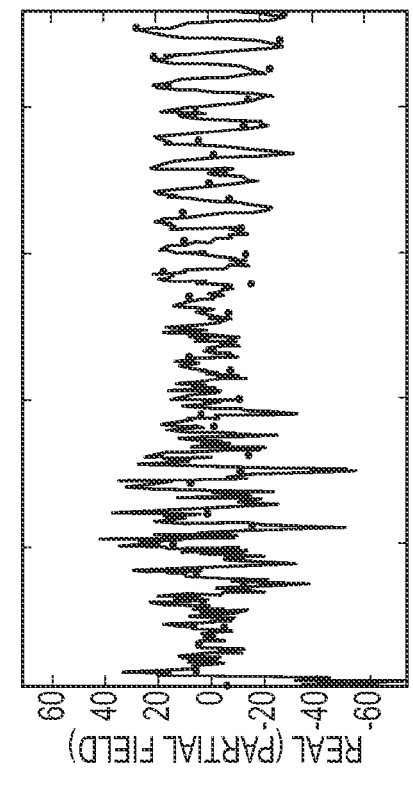
FIG. 19 is a graph depicting the real part of a dominant partial field for shock containing an underexpanded jet at 14.2 kHz.

FIG. 14 shows the real part of the dominant partial field at 2.0 kHz over the 48 axial points by fifteen circumferential points fixed-index grid. FIG. 15 shows the field plotted on the conical hologram surface. The dominant partial field at this frequency corresponds to a Strouhal number of 0.08. The Strouhal number is a dimensionless frequency equal to the product of temporal frequency and fully expanded jet diameter divided by fully expanded jet velocity. The wavelength close to the jet, for x/D<20 is shorter than further downstream, where the microphones are radially and axially more distant from the jet. The dominant noise mechanism at this frequency is associated with large scale turbulent structures convecting within the mixing layer of the jet. Close to the jet, the pressure field is dominated by hydrodynamic pressure fluctuations associated with these convecting turbulent structures. Further away, the wavelength corresponds to acoustic waves propagating through ambient air. Animation of the partial field shows that the wave-like structures convect downstream This can also be seen in the plot of the dominant partial field (real part) obtained along the line θ=−157.5° at 2.0, 4.0, 7.1, and 14.2 kHz shown in FIGS. 16-19. For example, by measuring the wavelength and the temporal frequency for the 2.0 kHz waveform it can be determined that these waves convect downstream near the speed of sound in the acoustic medium far downstream, while close to the jet nozzle these waves relate to convecting turbulent structures that travel at a speed that is roughly 70% of the jet velocity. A similar finding is observed at 4.0 kHz, though the data become noticeably noisier near the nozzle. Finally, the data at 7.1 kHz and 14.2 kHz reveal an entirely different propagation pattern. Far downstream, the propagation speed is still equal to the ambient sound speed, while upstream the waves appear to be standing when animated.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of imaging a test subject, comprising:
providing one or more moveable sensors to sense an attribute of the test subject, wherein the attribute is an acoustic attribute;
providing one or more reference sensors to sense the attribute of the test subject,
wherein the one or more moveable sensors and the one or more reference sensors are configured to sense the same attribute of the test subject;
moving each of the moveable sensors along a path while continuously acquiring test data that is indicative of the sensed attribute, the position, and the orientation of each of the moveable sensors and the reference sensors;
constructing a set of transfer functions corresponding to points in space that have been visited by the moveable sensors, each of the transfer functions relating the test data of the moveable sensors to the test data of the reference sensors; and
producing a visual representation of the attribute in a region adjacent the test subject using the set of transfer functions.

2. The method of claim 1, wherein constructing the set of transfer functions includes using Chebyshev-spaced trajectory points to achieve averaging between the points in space between the moveable sensors.

3. The method of claim 1, further including using a canonical coherence method to construct the set of transfer functions.

4. The method of claim 1, wherein the test subject comprises exhaust from an operating jet engine.

5. The method of claim 1, wherein moving each of the moveable sensors comprises using a robotic system to change the position of the moveable sensors.

6. The method of claim 1, wherein acquiring test data comprises acquiring position data for the moveable sensors using a locationing system coupled to the moveable sensors.

7. The method of claim 1, wherein the moveable sensors are fixed to a structure and are distributed linearly along a structure axis at substantially equal intervals along the structure.

8. The method of claim 1, wherein a locationing system is coupled to the moveable sensors, and the position of the moveable sensors is determined via the locationing system.

9. The method of claim 5, wherein the position of the moveable sensors is determined via the robotic system.

10. The method of claim 7, wherein continuously moving the moveable sensors along the path includes rotating the structure around the test subject.

11. The method of claim 10, wherein a primary axis of the structure is non-parallel to a major longitudinal axis of the test subject.

12. The method of claim 10, wherein the orientation of each moveable sensor with respect to the structure is substantially the same and generally faces the test subject.

13. A system for scanning a test subject, comprising:
one or more moveable sensors to continuously sense an attribute of the test subject during a test mode in which the one or more moveable sensors moves along a path with respect to the test subject, wherein the attribute is an acoustic attribute;
one or more reference sensors to sense the attribute of the test subject during the test mode, wherein the one or more moveable sensors and the one or more reference sensors are configured to sense the same attribute of the test subject;
a data acquisition system coupled to the moveable sensors and the reference sensors, wherein the data acquisition system acquires data associated with the sensed attribute, the position, and the orientation of each of the moveable sensors and the reference sensors during the test mode; and
a processor to analyze the acquired data and construct a set of transfer functions at points in space that have been visited by the moveable sensors and the reference sensors.

14. The system of claim 13, wherein the processor constructs the set of transfer functions by using Chebyshev-spaced trajectory points to achieve averaging between the points in space between the moveable sensors.

15. The system of claim 14, wherein the processor constructs the set of transfer functions using a canonical coherence procedure.

16. A method of producing an acoustic hologram associated with a test subject, comprising:
providing a plurality of moveable acoustic sensors and a plurality of stationary acoustic sensors, wherein the plurality of moveable sensors and the plurality of reference sensors are configured to sense the same attribute of the test subject, wherein the attribute is an acoustic attribute;
scanning the plurality of moveable acoustic sensors along a path while continuously acquiring, from the plurality of moveable acoustic sensors and the plurality of stationary acoustic sensors, acoustic test data associated with the test subject;
constructing a set of transfer functions corresponding to points in space that have been visited by the plurality of moveable acoustic sensors, each of the transfer functions relating the acoustic test data of the plurality of moveable acoustic sensors to the test data of the plurality of stationary acoustic sensors;
producing a visual representation of an acoustic hologram based on the set of transfer functions.

17. The method of claim 16, further including using a canonical coherence method to construct the set of transfer functions.

18. The method of claim 16, wherein constructing the set of transfer functions includes using Chebyshev-spaced trajectory points to achieve averaging for points in space between the plurality of moveable sensors.

19. The method of claim 16, wherein scanning the plurality of moveable sensors includes scanning along the path such that the path at least partially circumnavigates the test subject.

* * * * *